(12) United States Patent
Richardi et al.

(10) Patent No.: US 11,938,901 B2
(45) Date of Patent: *Mar. 26, 2024

(54) CATALYTIC CONVERTER THEFT PREVENTION AND RECOVERY

(71) Applicant: CATrak Technologies, Inc., Huntington Beach, CA (US)

(72) Inventors: Mark Steven Richardi, Huntington Beach, CA (US); John Rollins, Palo Alto, CA (US); Natasha Peterson, Yucca Valley, CA (US); Gregory Duff Bracy, Simi Valley, CA (US)

(73) Assignee: CATrack Technologies, Inc., Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,145

(22) Filed: Jul. 19, 2023

(65) Prior Publication Data
US 2023/0365104 A1 Nov. 16, 2023

Related U.S. Application Data

(63) Continuation of application No. 18/013,345, filed as application No. PCT/US2022/039223 on Aug. 2, 2022.
(Continued)

(51) Int. Cl.
*B60R 25/33* (2013.01)
*B60R 25/10* (2013.01)
(Continued)

(52) U.S. Cl.
CPC .......... *B60R 25/33* (2013.01); *B60R 25/1004* (2013.01); *B60R 25/102* (2013.01);
(Continued)

(58) Field of Classification Search
CPC .. G06K 9/00; G06K 9/00832; G06K 9/00355; G06K 9/00375; G06F 3/00;
(Continued)

(56) References Cited

U.S. PATENT DOCUMENTS

| 4,496,809 A | 1/1985 | Faust et al. |
| 7,971,676 B2 | 7/2011 | Dusa |

(Continued)

FOREIGN PATENT DOCUMENTS

| GB | 2481574 A | 1/2012 |

OTHER PUBLICATIONS

NPL Search (Nov. 24, 2023).*
(Continued)

*Primary Examiner* — Van T Trieu
(74) *Attorney, Agent, or Firm* — Umberg Zipser LLP; Ryan Dean (57) ABSTRACT

A tethered device for prevention and recovery of a vehicle component (e.g., a catalytic converter) is provided herein. The tethered device comprises a housing having an exterior surface and defining an interior cavity. The tethered device further comprises an electronic component disposed within the interior cavity. The tethered device further comprises a plurality of spacers extending from the exterior surface and configured to be adjacent to the vehicle component. The plurality of spacers defines a channel configured to promote airflow between the tethered device and the vehicle component thereby minimizing heat transfer between the tethered device and the vehicle component.

20 Claims, 12 Drawing Sheets

Related U.S. Application Data (60) Provisional application No. 63/228,392, filed on Aug. 2, 2021.

(51) Int. Cl.
*B60R 25/102* (2013.01)
*B60R 25/104* (2013.01)
*B60R 25/40* (2013.01)
*F01N 99/00* (2010.01)

(52) U.S. Cl.
CPC .......... *B60R 25/1045* (2013.01); *B60R 25/40* (2013.01); *F01N 99/00* (2022.08); *B60R 2025/1015* (2013.01); *B60R 2025/1016* (2013.01); *B60R 2325/10* (2013.01); *B60R 2325/30* (2013.01); *F01N 2260/22* (2013.01)

(58) Field of Classification Search
CPC ... G06F 3/01; G06F 3/017; G06F 3/16; G06F 3/167; G01S 5/14; H04W 4/00; H04W 4/40
See application file for complete search history.

(56) References Cited

U.S. PATENT DOCUMENTS

| | | | |
|---|---|---|---|
| 8,002,232 B2 | 8/2011 | Meislahn | |
| 8,453,784 B2 | 6/2013 | Dusa | |
| 8,963,699 B2 | 2/2015 | Potter | |
| 9,030,310 B2 | 5/2015 | Wiemeersch et al. | |
| 9,227,594 B2 | 1/2016 | Reed et al. | |
| 9,631,541 B2 | 4/2017 | Wiemeersch et al. | |
| 2002/0027523 A1* | 3/2002 | Muramatsu | G08G 1/205 342/357.57 |
| 2007/0240934 A1 | 10/2007 | Flier et al. | |
| 2011/0036130 A1 | 2/2011 | Hisler | |
| 2013/0300550 A1 | 11/2013 | Potter | |
| 2014/0104048 A1 | 4/2014 | Kock et al. | |
| 2014/0266654 A1 | 9/2014 | Parker | |
| 2017/0060199 A1* | 3/2017 | Kim | G06F 1/20 |
| 2017/0248489 A1 | 8/2017 | Gibson et al. | |
| 2021/0097315 A1* | 4/2021 | Carruthers | G08B 13/19645 |
| 2021/0123936 A1* | 4/2021 | Swanson | G01N 21/05 |
| 2021/0278570 A1* | 9/2021 | Hottmann | G03B 11/045 |
| 2022/0384889 A1* | 12/2022 | Radovich | H01M 50/296 |
| 2023/0406263 A1* | 12/2023 | Richardi | B60R 25/1004 |

OTHER PUBLICATIONS

International Search Report and Written Opinion; International Application No. PCT/US22/39223; International filing date Aug. 2, 2022; dated Dec. 19, 2022, 10 pages.

\* cited by examiner

CATALYTIC CONVERTER THEFT PREVENTION AND RECOVERY

CROSS-REFERENCE TO RELATED APPLICATIONS

This application is continuation application of U.S. patent application Ser. No. 18/013,345 filed on Dec. 28, 2022, which is a national phase (§ 371) application of PCT application no. PCT/US22/39223 filed on Aug. 2, 2022, which itself claims the benefit of priority to U.S. Provisional Application No. 63/228,392, filed Aug. 2, 2021. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

TECHNICAL FIELD

The technical field is directed to a system and a device for prevention and recovery of a vehicle component of a vehicle.

BACKGROUND

The following description includes information that may be useful in understanding the present invention. It is not an admission that any of the information provided herein is prior art or relevant to the presently claimed invention, or that any publication specifically or implicitly referenced is prior art.

Global theft of catalytic converters has reached epidemic proportions. Catalytic converters can be stolen from a vehicle in under two minutes using easily accessible tools. Aside from inconvenience, enormous monetary and efficiency losses are being borne by insurance companies, fleet operators, or those owning or operating a vehicle whose catalytic converter is stolen.

Catalytic converters have been mandated by governments for all gasoline cars and trucks in the United States since 1975. Catalytic converters are a mandatory part of a vehicle's exhaust system that reduces toxic emissions and pollutants. For example, catalytic converters contain many precious metals such as Rhodium, Platinum and Palladium, which are used to eliminate nitrogen oxide, carbon monoxide emissions or hydrocarbon emissions from unburnt fuel.

As the value of the precious metals continue to rise, U.S. and global theft rates have grown exponentially. Thefts of catalytic converters in commercial and consumer vehicles reached an all-time high in 2020, with many large cities reporting increases in left more than twenty times the number reported in 2019. In some areas, thefts have grown exponentially with thefts of catalytic converters on the west coast of the United States increasing more than 400% and more than 700% in Quebec, Canada year over year.

The most common solutions to try and prevent catalytic converter theft are cages, plates and other physical barriers. However, most physical barriers are easily cut and dismantled with saws used by thieves, and therefore offer only minimal protection. Such barriers can sometimes require professional installation raising the cost to the vehicle's owner.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved theft deterrent and tracking devices for catalytic converters.

SUMMARY OF THE INVENTION

A tethered device for prevention and recovery of a vehicle component (e.g., a catalytic converter) is provided herein. The tethered device comprises a housing having an exterior surface and defining an interior cavity. The tethered device further comprises an electronic component disposed within the interior cavity. The tethered device further comprises a plurality of spacers extending from the exterior surface and configured to be adjacent to the vehicle component. The plurality of spacers defines a channel configured to promote airflow between the tethered device and the vehicle component thereby minimizing heat transfer between the tethered device and the vehicle component.

A system for prevention and recovery of a vehicle component of a vehicle is also provided herein. The system comprises a tethered device comprising a GPS locator. The tethered device is configured to be fixedly coupled to the vehicle component. The system further comprises a vehicle device comprising a siren. The vehicle device is configured to be coupled to the vehicle. The system further comprises a communication cable coupled to the tethered device and the vehicle device for providing a communication signal between the tethered device and the vehicle device. The system is configured to cause the GPS locator to generate a location signal when there is an interruption in the communication signal through the communication cable. The system is configured to cause the siren to activate when there is an interruption in the communication signal through the communication cable.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DESCRIPTION OF THE INVENTION

The inventive subject matter provides apparatus, systems and methods for catalytic converter theft prevention and recovery. In some contemplated embodiments, a device can be affixed or otherwise attached to a vehicle's catalytic converter to monitor for potential theft. Advantageously, and compared with prior art trackers, the contemplated devices herein can be installed in minutes to the top, bottom, or side of a catalytic converter using the bonding agent and/or straps to hold the device in place.

Contemplated devices comprise an outer housing that at least partially defines an interior compartment. Within the interior compartment, various electronics can be housed that allow the devices to function as described herein. It is critical that this compartment is thermally insulated from the substantial amount of heat from the catalytic converter when operating. It was found that average catalytic converter surface area temperatures were between 415 degrees Fahrenheit and 455 degrees Fahrenheit, with temperatures as high as 2,000 degrees Fahrenheit on a faulty, clogged catalytic converter. Typical plastic PCB boards, components, batteries, and housings are rated at less than 200 degrees Fahrenheit. Thus, anything above this rated temperature threshold for short periods could prematurely affect the technology and rapidly deteriorate the housing and internal components.

As shown in FIGS. 1-8, the device 100 may comprise an outer housing or casing 102. The outer housing 102 can comprise a first side 104 having a curved surface with a plurality of channels 106 disposed parallel along the first side 104 from a first end to a second end. These channels 106 can be used to allow the first side 104 to be flexible, as well as promote airflow to facilitate heat transfer from the device 100. The flexibility of the first side 104 permits the device 100 to attach to catalytic converters 120 having different form factors. This is critical as there are a number of different sizes and form factors for catalytic converters 120 including cylindrical and ovular shaped converters having a range of diameters and with lengths mostly ranging between six to twenty-three inches. By ensuring the first side 104 attaching to the catalytic converter 120 is flexible, the same device 100 could be attached to various form factors of catalytic converters 120.

In various embodiments, the outer housing 102 is composed of a preformed aerogel or other insulating material capable of both withstanding the heat produced by the catalytic converter 120 (greater than 500° F.) and preventing excessive temperatures from reaching the enclosed cavity 112. In some embodiments, the aerogel is utilized due to its extremely low thermal conductivity of 0.03 W/(m·K) in atmospheric pressure. Generally speaking, aerogels are dry, nanoporous, nanostructured materials that exhibit a diverse array of extreme and valuable materials properties, e.g. low density, ultralow thermal conductivity, high density-normalized strength and stiffness, and high specific internal surface area, amongst others. The term aerogel may refer to a substance having a certain material composition that exhibits a particular geometry. Suitable aerogel material compositions may include, for example, silica, metal and metalloid oxides, metal chalcogenides, metals and metalloids, organic polymers, biopolymers, amorphous carbon, graphitic carbon, diamond, and discrete nanoscale objects such as carbon nanotubes, boron nitride nanotubes, viruses, semiconducting quantum dots, graphene, two-dimensional boron nitride, or combinations thereof.

Additionally, a number of aerogel nanocomposite configurations may be prepared, for instance, materials that integrate organic polymers and silica into a single network (e.g., ormosils, organically modified silica/silicate materials, etc.), materials in which two or more separate networks of different composition are interpenetrating (e.g., a metal oxide network interpenetrated with a resorcinol-formaldehyde polymer network), core-shell nanocomposites in which a polymer conformally coats the interior contour surfaces of an oxide network (e.g. x-aerogels, cross-linked aerogels, etc.), aerogels in which nanoparticles of a varying composition are dispersed (e.g. metal-nanoparticle-doped carbon aerogels, gold-nanoparticle-doped silica aerogels), and more. As provided herein, aerogel materials may be considered as any solid-phase material that is primarily mesoporous (i.e., contains pores between 2-50 nm in diameter), comprising at least a 50% void space by volume in which the solid-phase component comprises a 3D nanostructured solid network. Materials with pore sizes outside of 2-50 nm, e.g. <1-100 nm, <1 nm to less than about one micron, are also often considered aerogels. Accordingly, any material that meets this description may be considered as an aerogel material.

Some other contemplated materials include, for example, polyamide-imide (PAI), polytetrafluoroethylene (PTFE), perfluoroalkoxy (PFA), and DuPont™ Vespel® Polyimide. It is to be appreciated that any material may be utilized so long as the material is compatible with the temperature of the catalytic converter 120 and exhibits low thermal conductivity.

It is contemplated that the device 100 can include one or more holes 108 in the housing 102 to permit additional airflow and help to exhaust heat from/cool the interior of the housing 102. In certain embodiments, the device 100 comprises four holes 108 arranged laterally relative to each other and extending along the housing 102. In these and other embodiments, the holes 108 may have a circular cross section (see FIGS. 1-6). In other embodiments, the device 100 comprises two hole 108 arranged longitudinally relative to each other and extending along the housing 102. In these and other embodiments, the holes 108 may have an ovular cross section (see FIG. 7).

The outer housing 102 may further comprise a second side 122 opposite the first side 104. The device 100 may further comprise a cap 124 coupled to the second side 122. An enclosed cavity 112 may be defined between the outer housing 102 and the cap 124. The enclosed cavity 112 may be adapted to contain an electrical device 126. One or more risers 128 may extend from the outer housing 102 into the enclosed cavity 112. The electrical device 126 may be supported by the risers 128 to minimize movement of the electrical device 126 within the enclosed cavity 112 and to reduce contact between the electrical device 126 and the outer housing 102 for minimizing thermal transmittance from the catalytic converter 120 to the electrical device 126. In various embodiments, the cap 124 and the risers 128 are composed of the same material used to form the outer housing 102. However, it is to be appreciated that the cap 124 and the risers 128 may be composed of other materials.

In some embodiments, with particular reference to FIGS. 4-7, the device 100 further comprises a base 130 disposed between the outer housing 102 and the cap 124 and adapted to define the enclosed cavity 112 therebetween. The base 130 may be adapted to support the electrical device 126 and further isolate the electrical device 126 from the catalytic converter 120. Likewise, with particular reference to FIG. 6, the device 100 further comprises an insulation layer 132 disposed between the outer housing 102 and the base 130 to further isolate the electrical device 126 from the catalytic converter 120. In various embodiments, the base 130 and the insulation layer 132 are composed of the same material used to form the outer housing 102. However, it is to be appreciated that the cap 124 and the risers 128 may be composed of other materials.

Figure 1:
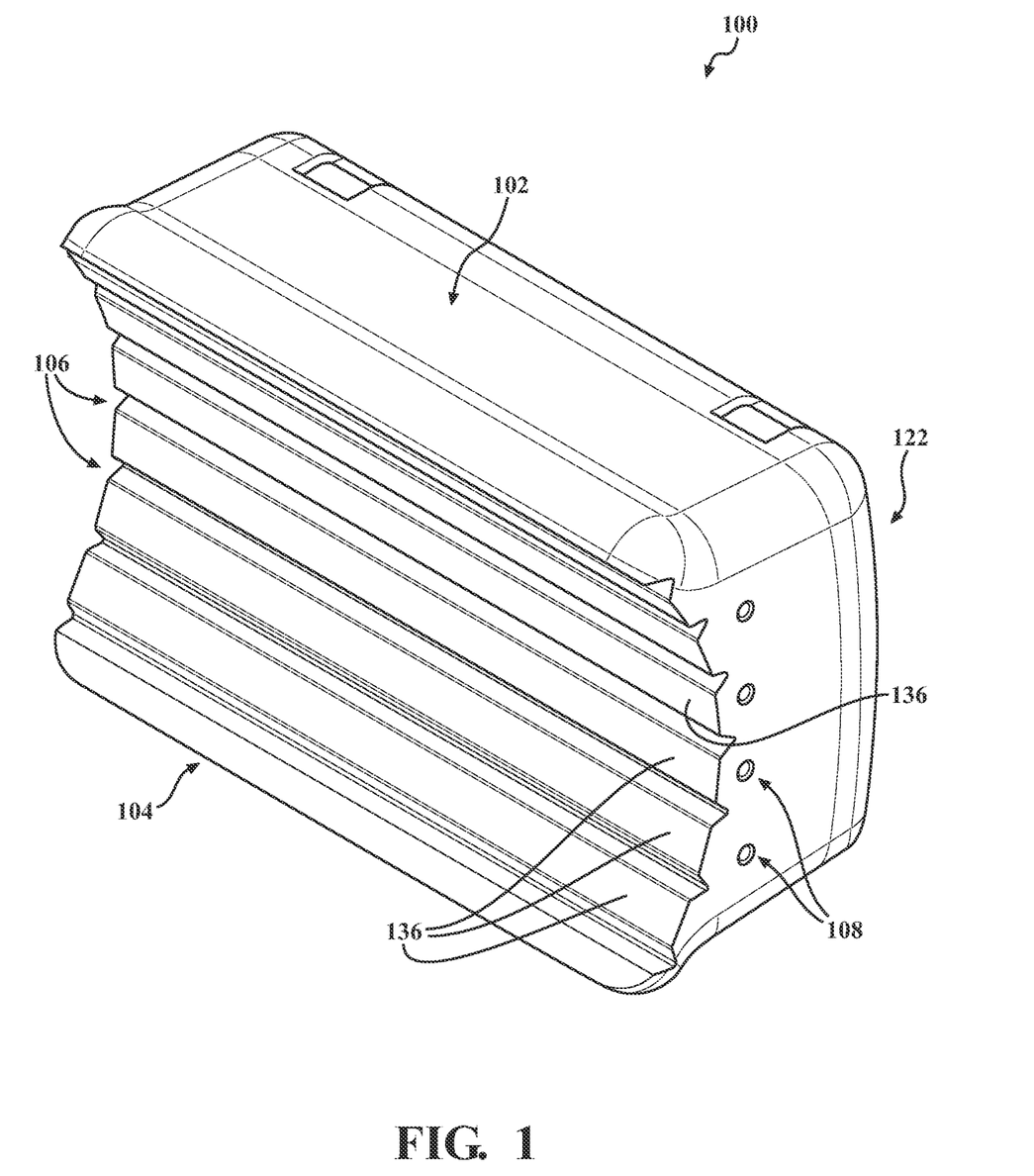
FIG. 1 is a perspective view illustrating a non-limiting embodiment of a tethered device comprising a housing.
Figure 2:
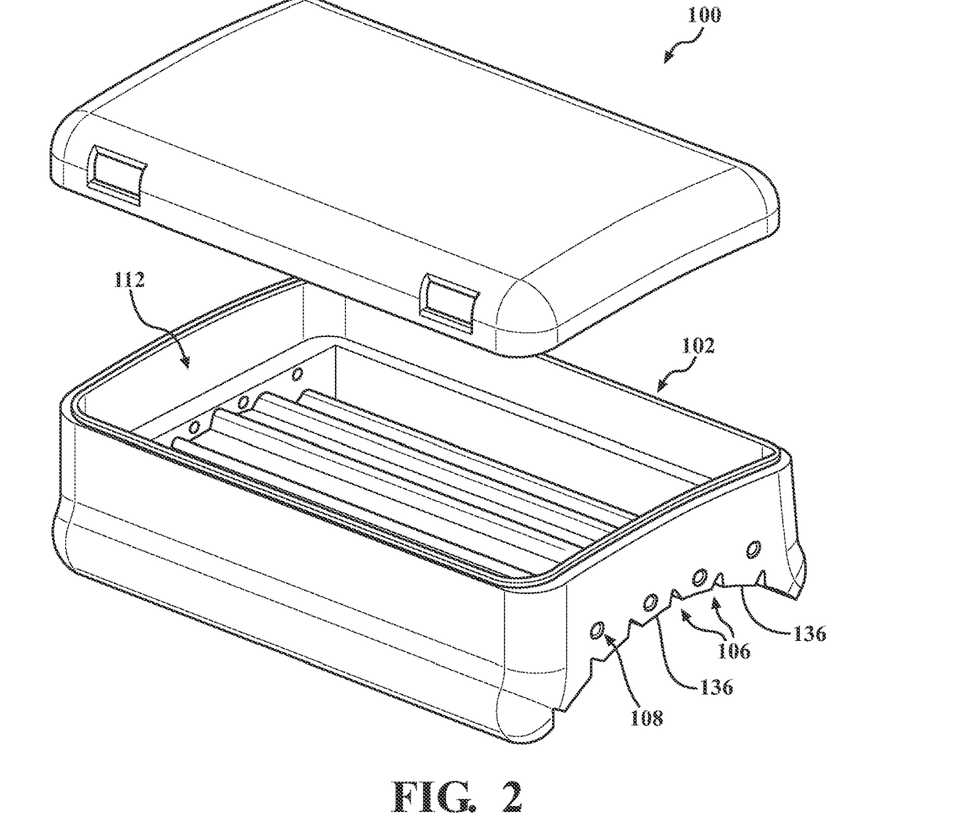
FIG. 2 is an exploded view illustrating a non-limiting embodiment of the housing of FIG. 1.
Figure 3:
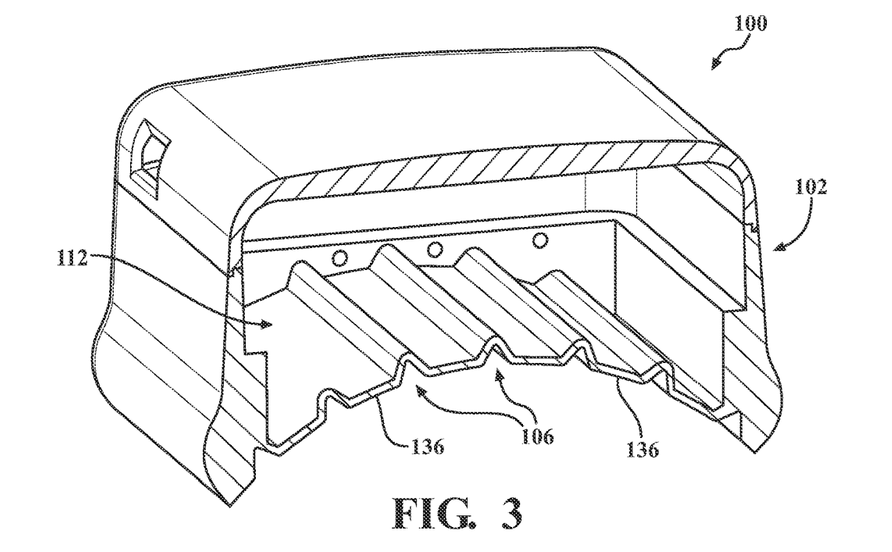
FIG. 3 is a cross-sectional view illustrating a non-limiting embodiment of the housing of FIG. 1.
Figure 4:
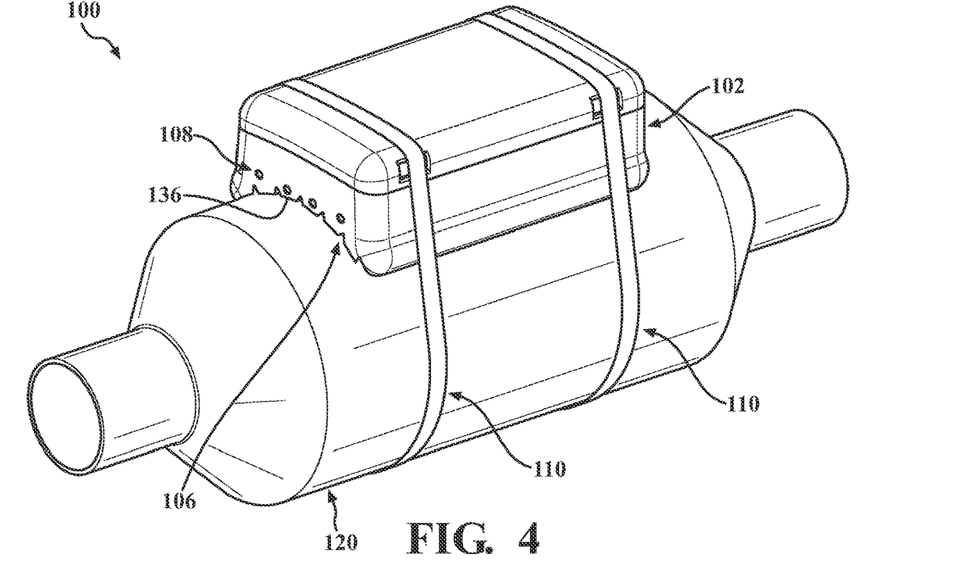
FIG. 4 is a perspective view illustrating a non-limiting embodiment of the tethered device of FIG. 1 coupled to a vehicle component.
Figure 5:
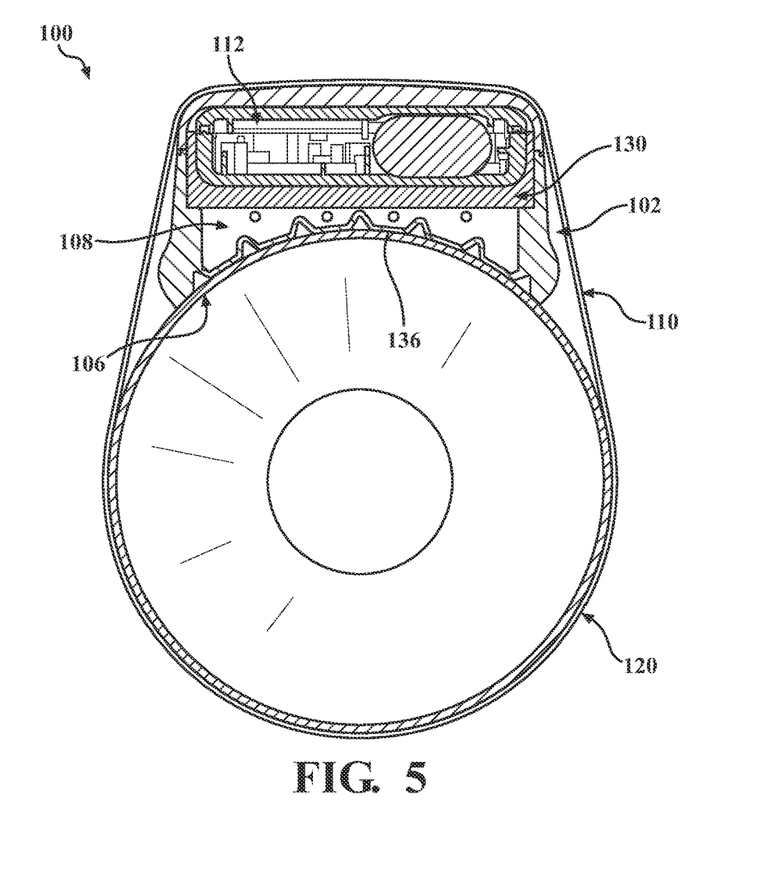
FIG. 5 is a cross-sectional view illustrating a non-limiting embodiment of the tethered device coupled to the vehicle component of FIG. 4.
Figure 6:
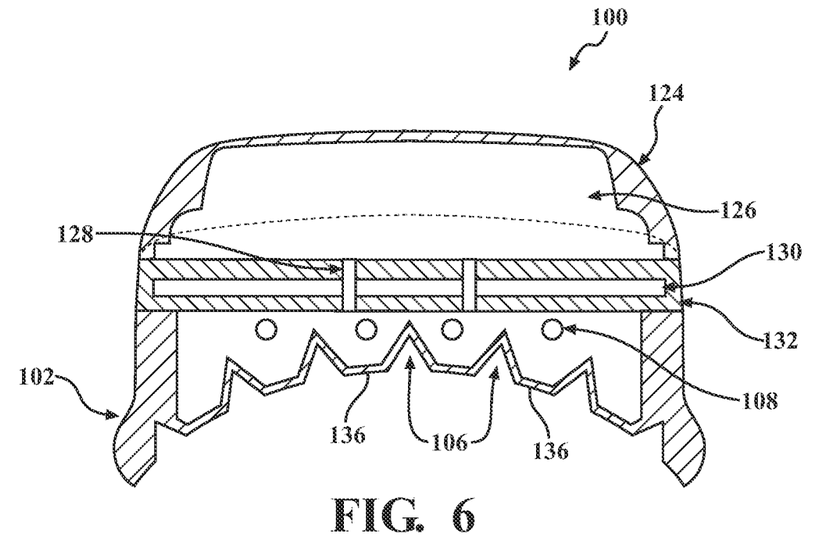
FIG. 6 is a cross-sectional view illustrating a non-limiting embodiment of the tethered device of FIG. 1 comprising an electronic component.
Figure 7:
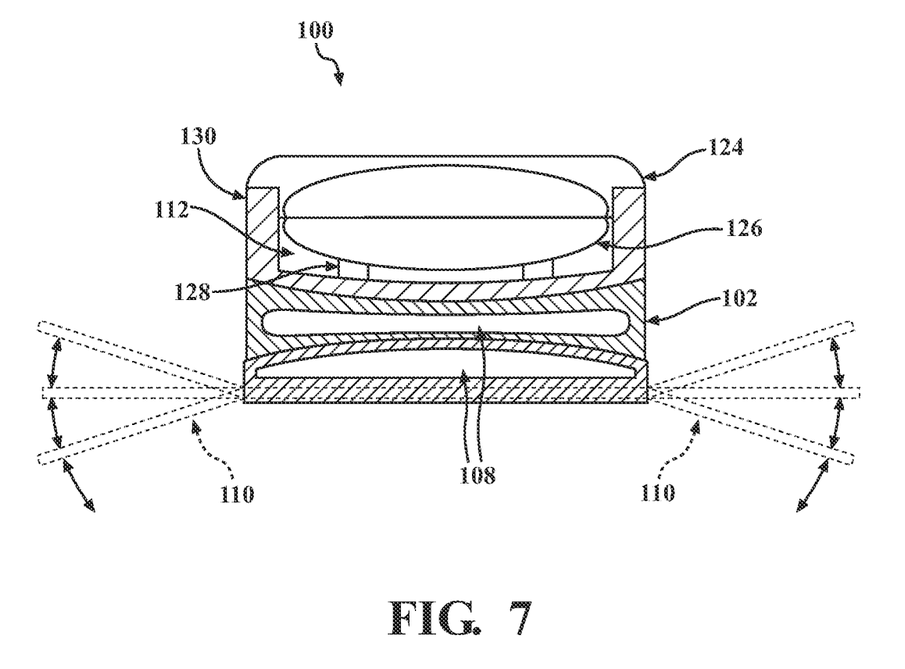
FIG. 7 is a cross-sectional view illustrating a non-limiting embodiment of the tethered device of FIG. 1 comprising another electronic component.
Figure 8:
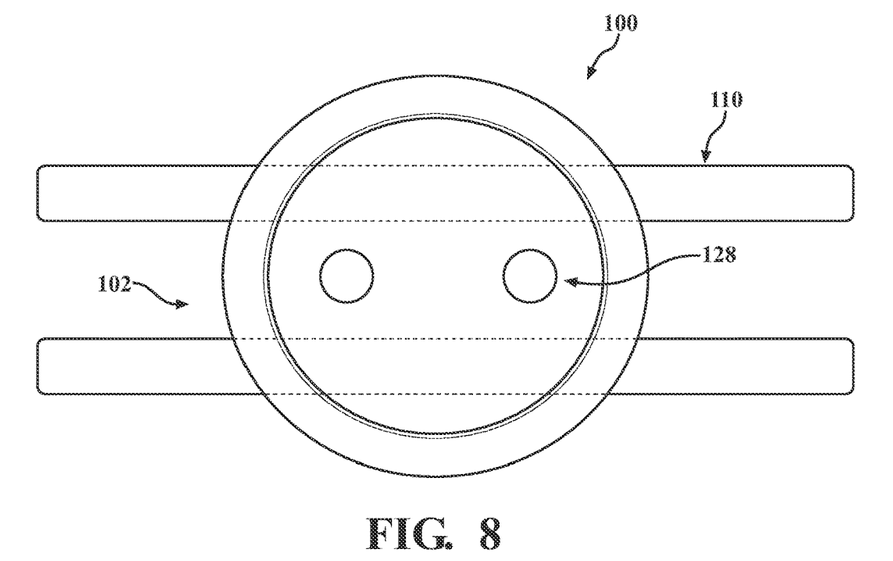
FIG. 8 is a top view illustrating a non-limiting embodiment of the tethered device of FIG. 1.

To attach the device 100 to the catalytic converter, an adhesive may be applied to the mounting surface of the catalytic converter 120 and/or first side 104 of the device 100. In an exemplary embodiment, a high heat silicone sealant is used to adhere the device 100 to the catalytic converter 120. Where desired, it is contemplated that stainless steel or similar rigid metal or other commercially suitable straps 110 could be used to further hold the device 100 in place on the catalytic converter 120, such as shown in FIGS. 4 and 5. The straps 110 can also be used to reduce to a considerable extent the stress on the silicone bonding agent.

Thus, to install the device 100 on the catalytic converter 120, it is contemplated that the silicone bonding agent can be applied to the device 100 and/or the catalytic converter 120 and the device 100 can then be pressed against the catalytic converter 120 until the bonding agent cures. Then the straps 110 can be tied around the catalytic converter 120 and device 100, and be tied together using a clamping tool, for example.

In other embodiments, the device 100 does not include the straps 110 and the adhesive described above couples the first side 104 of device 100 to the catalytic converted 120. The adhesive may be adapted to disassociate from at least one of the device 100 or the catalytic converter 120 when the surface of the catalytic converter 120 reaches a pre-determined temperature, such as 700 degrees Fahrenheit. This disassociation at the pre-determined temperature may be used to provide an indication that the catalytic converted 120 is failing. The device 100 may remain tethered to, but still disassociated from, the catalytic converted 120 or the vehicle including the catalytic converted 120 to prevent an inadvertent collision of the device 100 with another vehicle.

Figure 9:
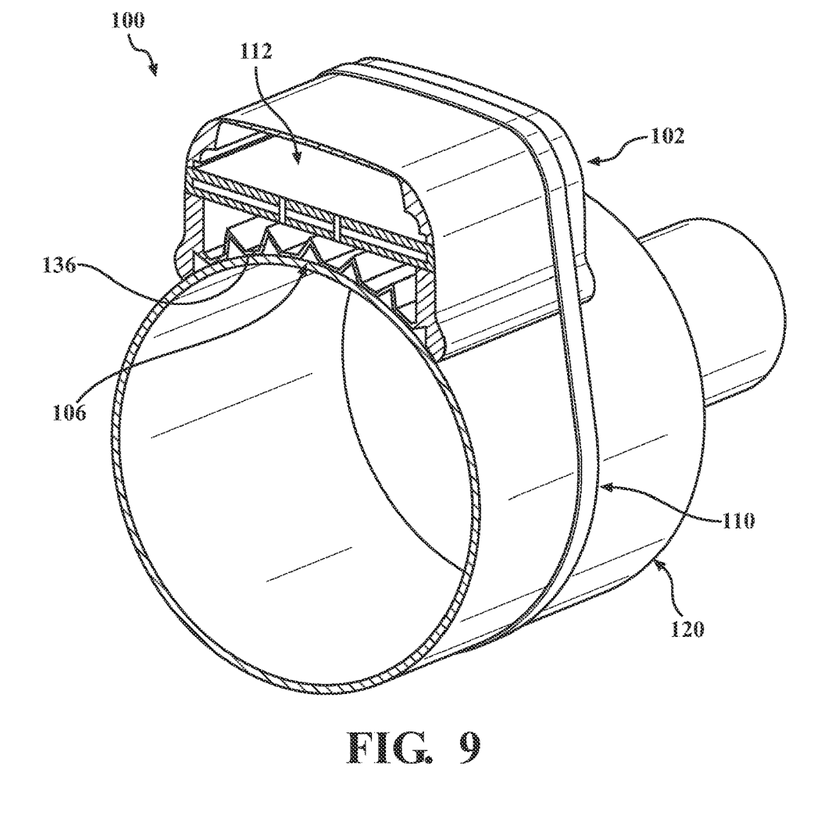
FIG. 9 is a schematic view illustrating a non-limiting embodiment of the tethered device of FIG. 1 coupled to a vehicle component.

The enclosed cavity 112 of the outer housing 102 can house various electronics including, for example, a micro or other PCB, which is communicatively coupled with an accelerometer, an alarm, a battery and a GPS transceiver. This insulated cavity 112 advantageously protects the electronics from the high temperature of the catalytic converter 120 and maintains temperatures within their acceptable tolerances. Non-limiting examples of suitable electronic devices 126 include trackers, such as those commercially available from Xirgo Global under the tradename of Sensata, such as XT4500 and XG4600, from Montage under the tradename Dagger, and from Micron under the tradename Pod. The temperature gradient across the device 100 is shown in FIG. 9, wherein the catalytic converter 120 can be more than 500° F., while the interior cavity of the device 100 remains below 200° F.

Figure 10A:
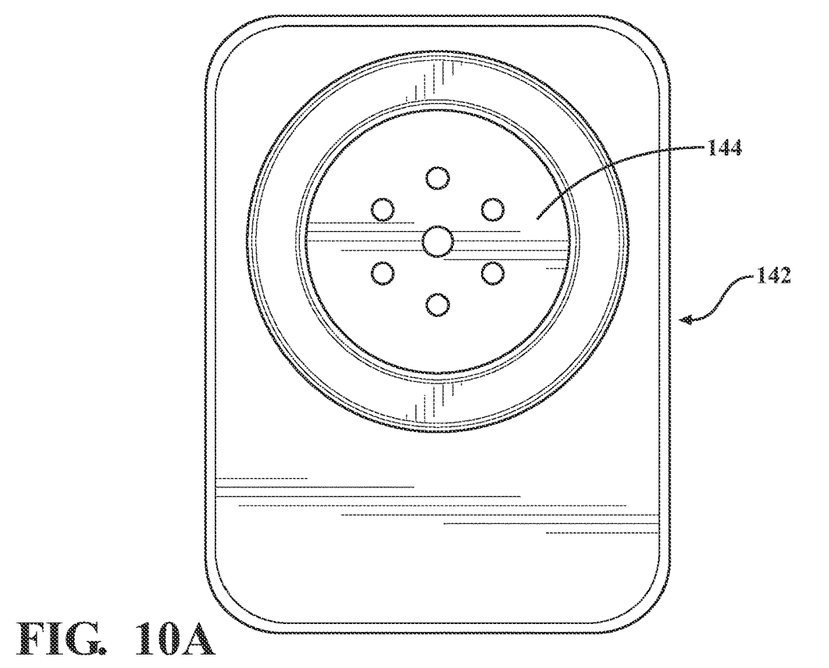
FIG. 10A is a front view illustrating a non-limiting embodiment of a siren.
Figure 10B:
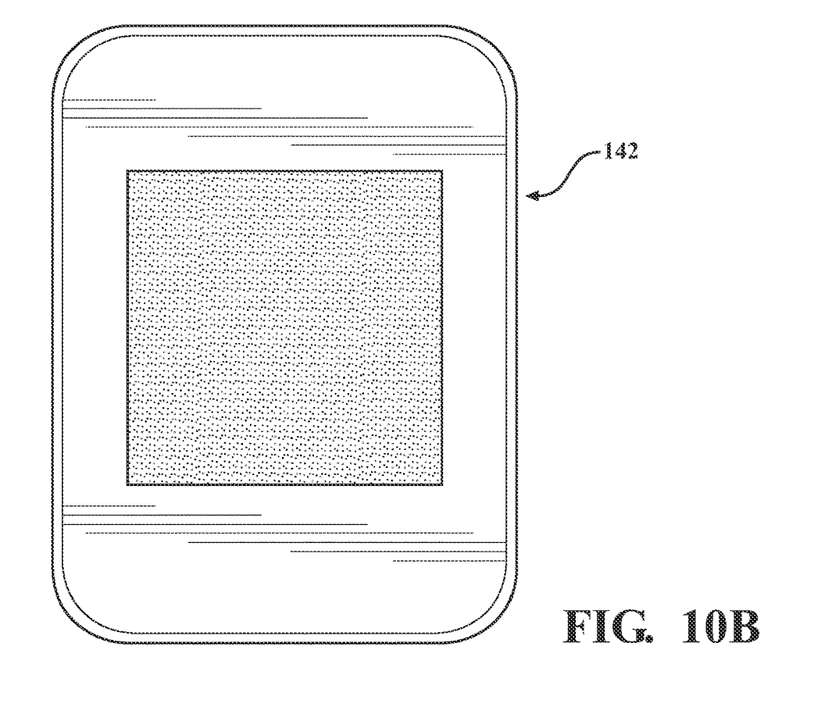
FIG. 10B is a rear view illustrating a non-limiting embodiment of the siren of FIG. 10A.

An algorithm stored on the PCB or other location can receive a signal from the embedded accelerometer if unusual movement is detected and cause a 130 dB siren (see FIGS. 10A and 10B) or other alarm (e.g. a horn of the vehicle or any other audible device incorporated with the vehicle) to sound if the catalytic converter 120 is tampered with or removed. In certain embodiments, the siren is located away from the device 100, for example in a secured compartment of the vehicle, to prevent undesirable manipulation of the device 100. Non-limiting examples of suitable compartments of the vehicle includes the engine compartment, the truck, the interior cabin, and the like. The siren may be in electrical communication with the device 100 via a wired connection or a wireless connection (e.g. Bluetooth).

It is contemplated that the algorithm could be programmed to determine when the vehicle is in motion and at rest to help prevent false positives. In addition, the algorithm should be able to differentiate between external shocks to the device while moving or even while ramping up or down where the earth gravity vector projection will change the captured three-dimensional acceleration. The algorithm could be programmed to analyze gravity vector projections, shock levels and directions, and shock signal shapes, duration and repetition, for example.

A microphone can be used to detect acoustical sounds of common power tools used when stealing catalytic converters and send a signal to the PCB if such sounds are detected to active the alarm and/or other components. In addition to the alarm, the PCB can transmit an alert to a remote server to create a notification on an app on a user's phone or other device for example, as well as activate the GPS thereby allowing for the device to be tracked with the catalytic converter.

Figure 11:
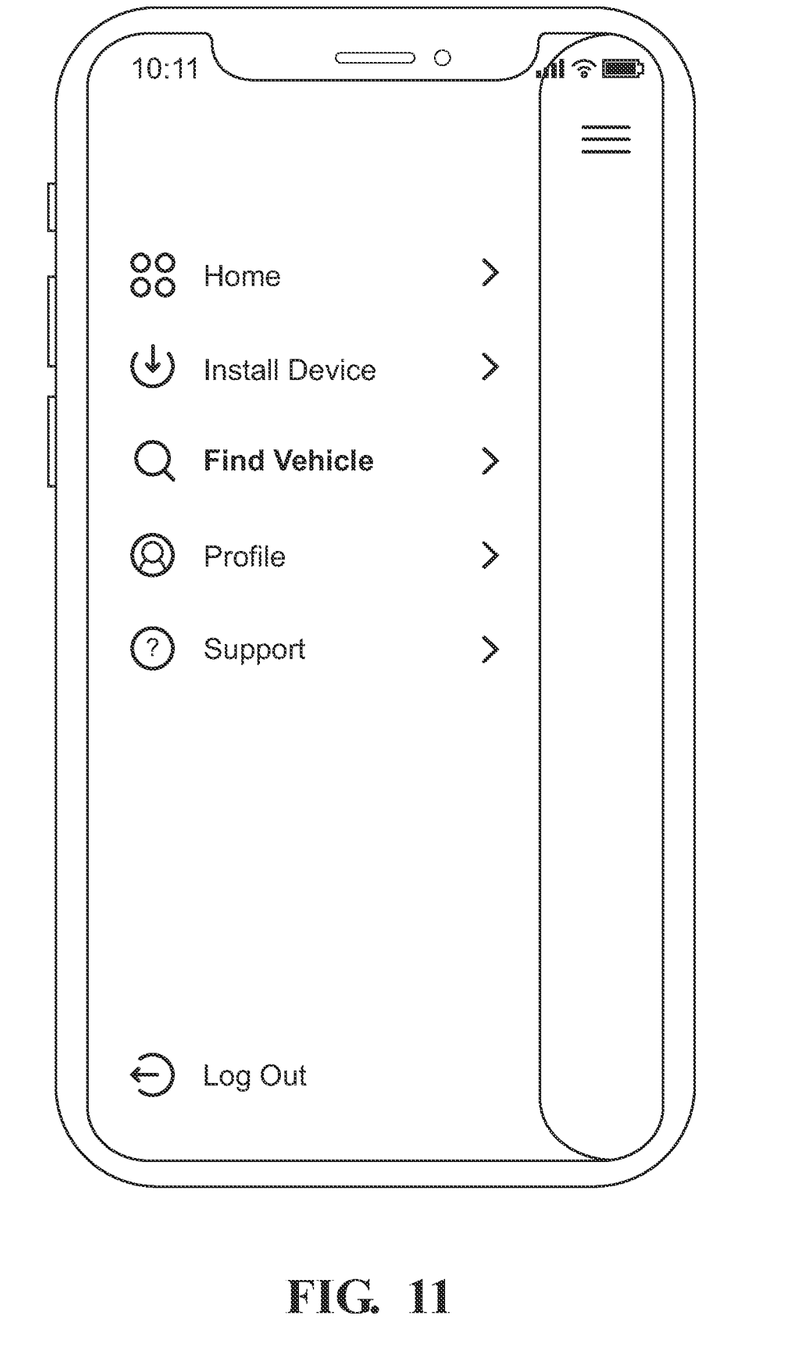
FIG. 11 is a front view illustrating a non-limiting embodiment of a phone showing an application for the tethered device of FIG. 1.
Figure 12A:
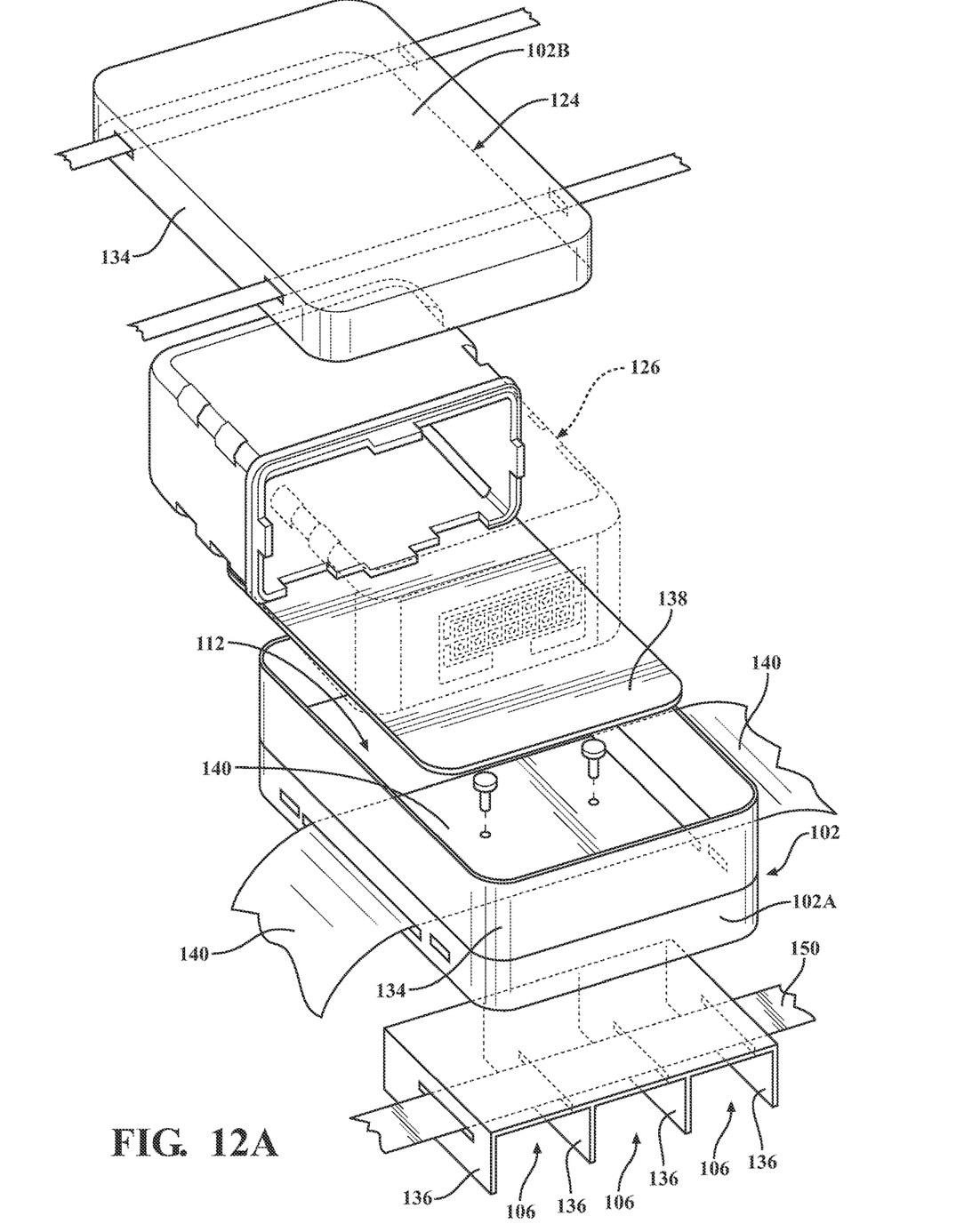
FIGS. 12A and 12B are exploded views illustrating non-limiting embodiments of a tethered device.
Figure 12B:
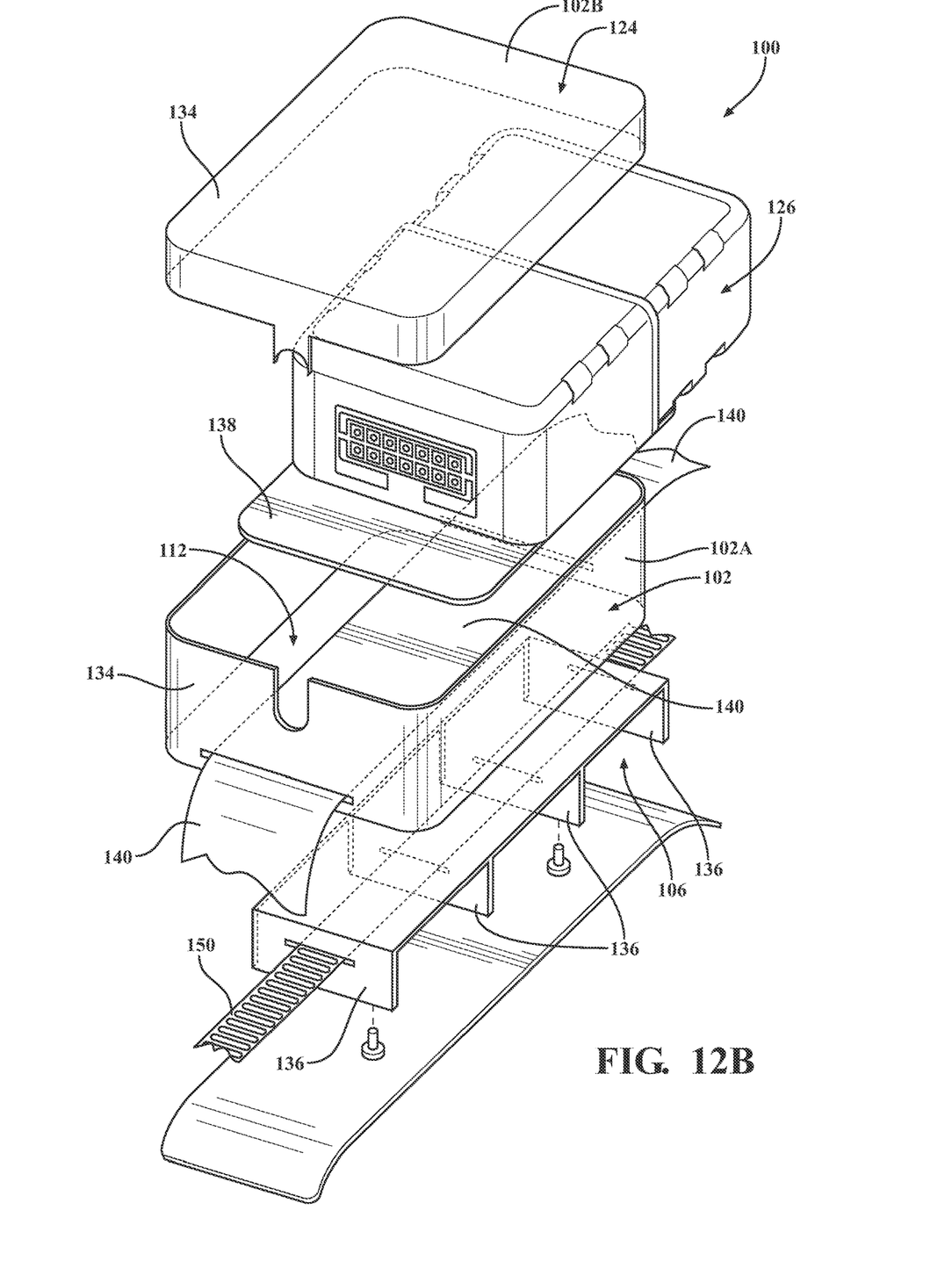
Figure 13A:
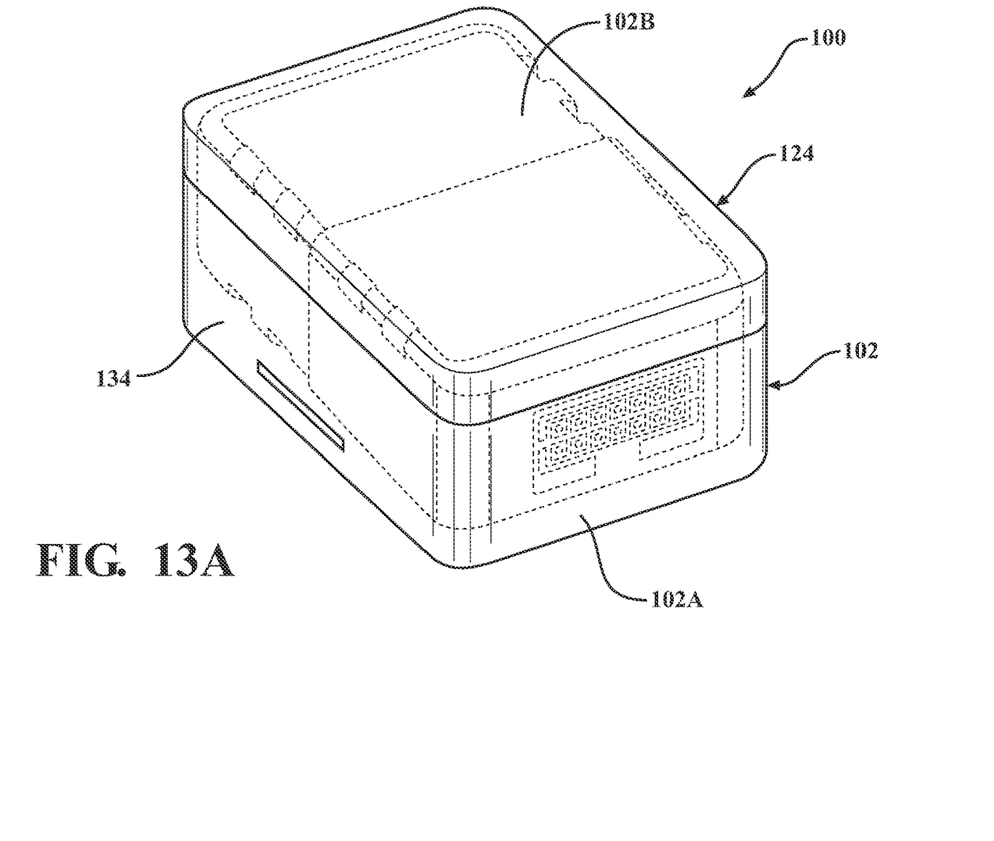
FIGS. 13A, 13B, and 13C are perspective views partially in phantom illustrating non-limiting embodiments of the tethered device of FIGS. 12A and 12B.
Figure 13B:
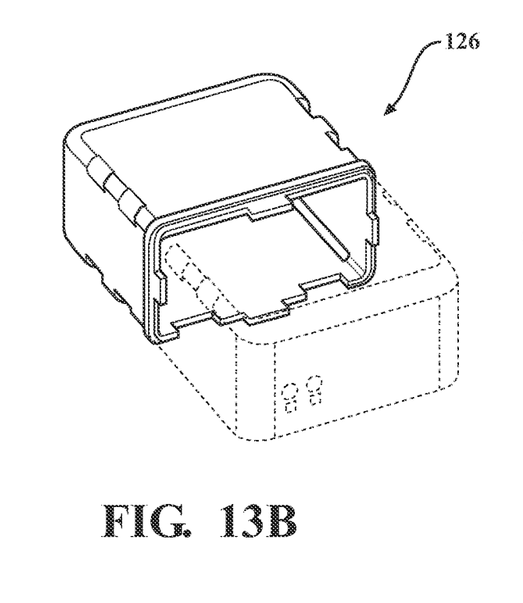
Figure 13C:
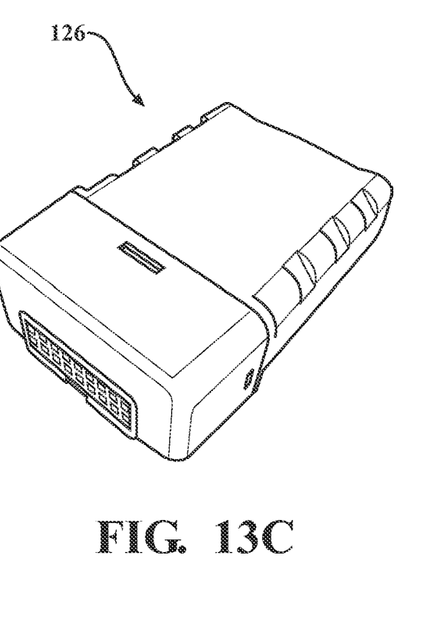

Thus, in such embodiments, the siren and GPS can be activated concurrently using acoustic recognition of a sawzall or similar tools as well as abnormal tilt of the catalytic converter (e.g., tilting the catalytic converter 60-degrees in any direction). Once activated, the app can track the catalytic converter in real time using GPS should it be removed from the vehicle's location. Important information such as catalytic converter serial numbers associated with the vehicle can be stored, which could be later used to prove ownership should a thief be caught with the stolen converter. It is contemplated that each tracking device can have a unique IMEI number that is associated with each specific catalytic converter serial number providing proof of ownership in a database.

Where remote communication is desired, such as with an app (e.g. FIG. 11), it is contemplated that the device could include a cellular modem or other transceiver to allow the device to connect to a remote server or other device. The transceiver could allow for the device to connect via a wireless network to the remote server. Because vehicles are often not parked in areas with strong Wi-Fi signals, the cellular modem would allow for continuous monitoring and tracking of the device, as needed. Remote communication of the device 100 may permit location tracking of the device 100, notifying the user of an attempted theft of the device 100, disarming of the device 100 (e.g. during service of the vehicle), and tracking the health of the catalytic converter 120 by monitoring the temperature of the catalytic converter 120. It is to be appreciated that a plurality of devices 100 can be tracked by an organization to monitor a certain subset of vehicles for defective catalytic converters 120. If desired, internal temperature and humidity sensors could be included to ensure the conditions within the cavity are within recommended ranges.

It is also contemplated that the device 100 can include a "peel and stick" cover.

In alternative embodiments, a device (not shown) includes a cable configured to transmit an electrical signal between at least one of a controller or a siren. The device may further include a shielding disposed around the cable. The cable and the shielding may extend along the exhaust system of a vehicle, including the catalytic converter, to deter theft of the catalytic converter and activate a siren when a theft is attempted. During an attempted theft, an attempt to cut through the exhaust system will result in cutting the wire thereby preventing communication of the electrical signal to the controller, siren, or both.

With reference to FIGS. 1-16, in various exemplary embodiment, a tethered device 100 for prevention and recovery of a vehicle component 120 (e.g., a catalytic converter) is provided herein. The tethered device 100 comprises a housing 102 having an exterior surface 134 and defining an interior cavity 112. The tethered device 120 further comprises an electronic component 126 disposed within the interior cavity 112. The tethered device 100 further comprises a plurality of spacers 136 extending from the exterior surface 134 and configured to be adjacent to the vehicle component 120. The plurality of spacers 136 defines a channel 106 configured to promote airflow between the tethered device 100 and the vehicle component 120 thereby minimizing heat transfer between the tethered device 100 and the vehicle component 120.

The inventors contemplate that the electronic component 126 comprises a computing device, a siren, an audio sensor, an accelerometer, a gyroscope, a cellular modem, a GPS locator, a battery, a wireless transceiver, or combinations thereof. In exemplary embodiments, the electronic component 126 comprises the computing device, the battery, the wireless transceiver, and the GPS locator. In these and other embodiments, the computing device is configured to cause the wireless transceiver to generate an alert signal when the tethered device 100 is isolated from the external power. Further, in various embodiments, the computing device is configured to cause the GPS locator to generate a location signal when the tethered device 100 is isolated from the external power. To this end, the battery is configured to energize the computing device, the wireless transceiver, and the GPS locator when the tethered device 100 is isolated from the external power.

In some embodiments, the plurality of spacers 136 is adapted to be adjacent to a catalytic converter. For example, the plurality of spacers 136 may be adapted to conform to the shape of the catalytic converter to improve transmissivity of the heat generated by the catalytic converted to the plurality of spacers 136. The plurality of spacers 136 may be formed from any material suitable for transmitting heat, such as a thermal conductive material. Non-limiting examples of suitable materials include metals, such as aluminum, steel, or a combination thereof. The plurality of spacers 136 may be arranged as a heat sink with the heat sink having a length extending along the exterior surface 134, Each spacer 136 may have a height extending away from the exterior surface 134 and a width transverse to the height. Each spacer 136 has height to width ratio of at least 3:1.

In some embodiments, the housing 102 comprises a polymeric material and an insulative material such that the interior cavity 112 does not exceed a temperature of more than 200 degrees F., no more than 175 degrees F., or no more than 150 degrees when the device is attached to the vehicle component. The polymeric material may be thermoplastic. In certain embodiments, the polymeric material comprises a polyamide, such as Nylon 66 which is commercially available. The insulative material may comprise glass. In certain embodiments, the insulative material comprises glass in an amount of at least 1 wt. %, 5 wt. %, or 10 wt. % based on a total weight of the insulative material (e.g., 15 wt. %). The inventors have unexpectedly discovered that the polymeric material having a melting point of 500 degrees F. and combined with glass results in an insulative material that is heat resistant while maintaining workable using ultrasonic welding.

The housing 102 may comprise a first portion 102A and a second portion 102B that are ultrasonically welded together. The ultrasonic welding process may be operated at a frequency of from 20 Hz to 40 Hz with a downward pressure of from 30 to 100 psi (e.g., 70 psi). The housing 102 may have a thickness from 0.001 inch to 1 inch (e.g., 0.1 inch).

In various embodiments, the tethered device 120 further comprises an insulative layer 138 disposed within the interior cavity 112 and disposed between the electronic component 126 and the housing 102 proximate to the plurality of spacers 136. The insulative layer 138 may comprise a silicate (e.g., vitreous silicate fiber) and a metal (e.g., aluminum or steel). The insulative layer 138 is commercially available from Heatshield Products under the tradename Heatshield Armor.

The tethered device 120 may further comprise an insert 140 comprising a middle portion of the insert 140 disposed within the interior cavity 112 of the housing 102 and an exterior portion of the insert 140 extending through the exterior surface of the housing 102.

Figure 15:
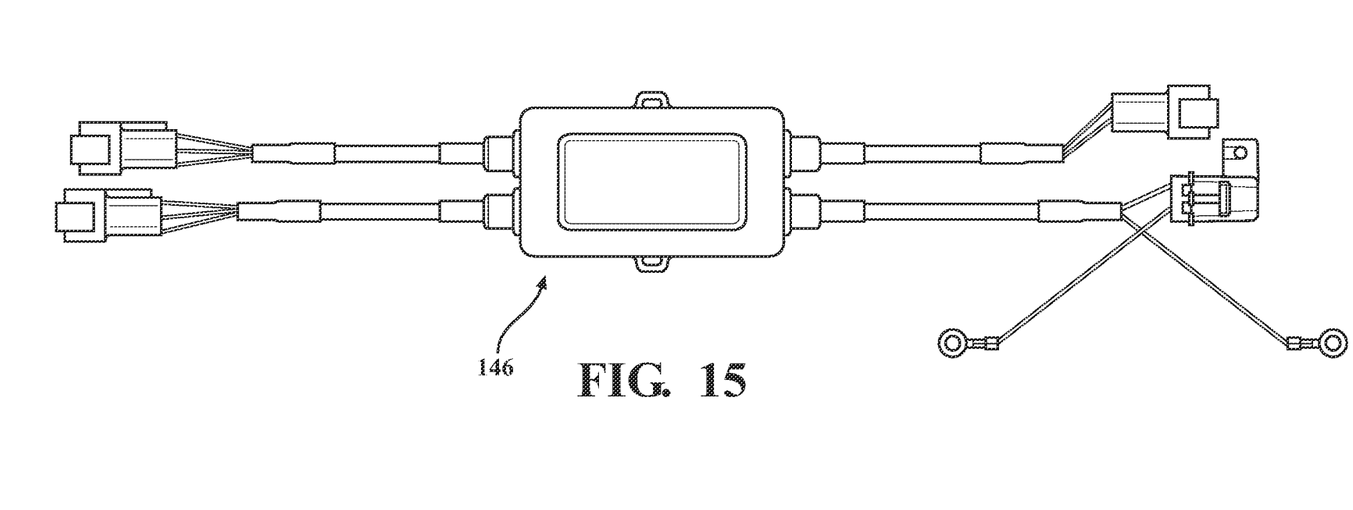
FIG. 15 is a perspective view illustrating a non-limiting embodiment of a vehicle device.
Figure 16:
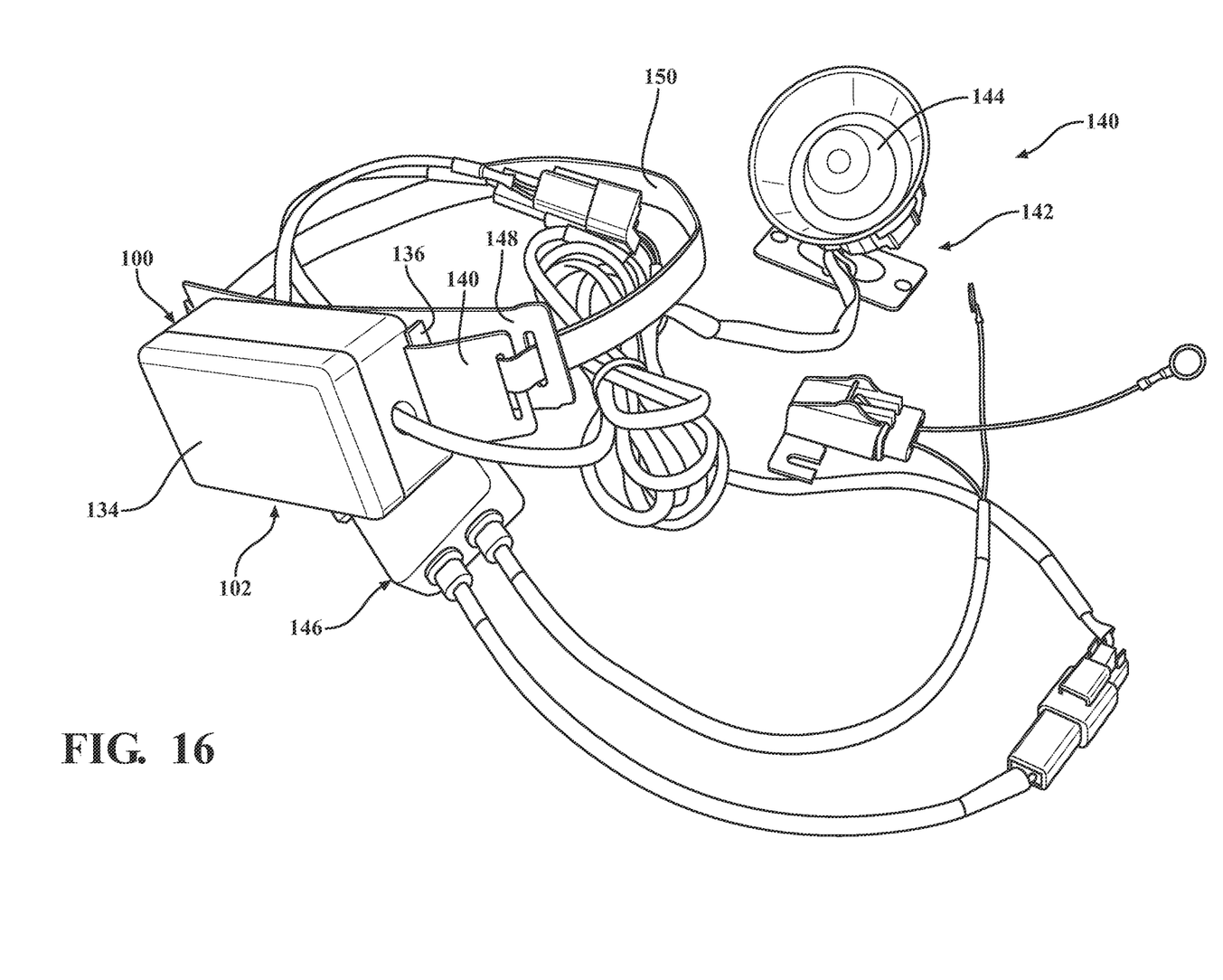
FIG. 16 is a photograph illustrating a non-limiting embodiment of a system comprising a tethered device and a vehicle device.

A system 140 for prevention and recovery of a vehicle component 120 of a vehicle is also provided herein. The system 140 comprises a tethered device 100 comprising a GPS locator. The tethered device 100 is configured to be fixedly coupled to the vehicle component 120. The system 140 further comprises a vehicle device 142 comprising a siren 144. The vehicle device 142 is configured to be coupled to the vehicle. The system 140 further comprises a communication cable 146 coupled to the tethered device 100 and the vehicle device 142 for providing a communication signal between the tethered device 100 and the vehicle device 142. The system 140 is configured to cause the GPS locator to generate a location signal when there is an interruption in the communication signal through the communication cable 146. The system 140 is configured to cause the siren 144 to activate when there is an interruption in the communication signal through the communication cable 146.

In various embodiments, the vehicle device 142 is configured to receive an electrical current from the vehicle and provide the electrical current as the signal to the tethered device 100 through the communication cable 146. In these and other embodiments, the tethered device 100 further comprises a battery for energizing the GPS locator when there is an interruption in the communication signal through the communication cable 146. The tethered device 100 may further include a wireless transceiver. To this end, the system 140 is configured to cause the wireless transceiver to generate an alert signal when there is an interruption in the communication signal through the communication cable 146.

Figure 14:
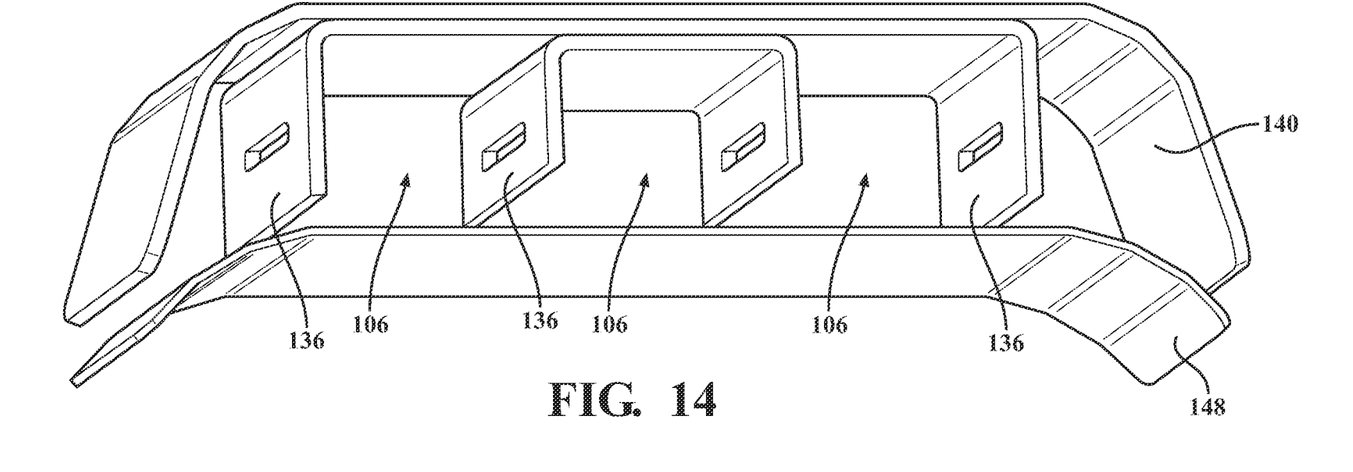
FIG. 14 is a perspective view illustrating a non-limiting embodiment of an insert, a plurality of spacers, and a bracket of FIGS. 12A and 12B.

In exemplary embodiments, the tethered device 100 further comprises the housing 102 having the exterior surface 134 and defining the interior cavity 112 with the GPS locator disposed within the interior cavity 112. The tethered device 100 further comprises an insert 140 with a middle portion of the insert 140 disposed within the interior cavity of the housing and an exterior portion of the insert 140 extending through the exterior surface 134 of the housing 102. The tethered device 100 further comprises the plurality of spacers 136 extending from the exterior surface 134 and configured to be adjacent to the vehicle component. The tethered device 100 further comprises a bracket 148 disposed adjacent to the plurality of spacers 136 and opposite the insert. The tether device 100 further comprises a strap 150 configured to couple to the vehicle component and configured to extend through the insert 140, the plurality of spacers 136, and the bracket 148 to prevent removal of the tethered device 100 from the vehicle component.

The strap 150 may comprises an adhesive configured to be disposed between the strap 150 and the vehicle component. The vehicle component may comprise a catalytic converter.

Throughout the above discussion, references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The discussion herein provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refers to at least one of something selected from the group consisting of A, B, C . . . and N, the text should be interpreted as requiring only one element from the group, not A plus N, or B plus N, etc.

What is claimed is:

1. A device for monitoring a vehicle component, comprising:
   a housing having an exterior surface and defining an interior cavity;
   an electronic component disposed within the interior cavity, wherein the electronic component comprises a computing device, and wherein the electronic component is communicatively coupled with a wireless transceiver and a GPS locator; and
   a plurality of spacers extending from the exterior surface and configured to be adjacent to the vehicle component;
   wherein the plurality of spacers defines a channel configured to promote airflow between the device and the vehicle component thereby minimizing heat transfer between the device and the vehicle component;
   wherein the battery is configured to energize the computing device, the wireless transceiver, and the GPS locator when the device is isolated from an external power source; and wherein, when the electronic component is isolated from the external power source, the electronic component is configured to (i) cause the wireless transceiver to generate an alert signal and (ii) cause the GPS locator to generate a location signal.

2. The device of claim 1, wherein the electronic component comprises a siren, an audio sensor, an accelerometer, a gyroscope, a cellular modem, the GPS locator, a battery, the wireless transceiver, or combinations thereof.

3. The device of claim 2, wherein the electronic component comprises the computing device, the battery, the wireless transceiver, and the GPS locator, and wherein the battery is configured to energize the computing device, the wireless transceiver, and the GPS locator when the device is isolated from the external power.

4. The device of claim 1, wherein the plurality of spacers is adapted to be adjacent to a catalytic converter.

5. The device of claim 1, wherein the housing comprises a polymeric material and an insulative material such that the interior cavity does not exceed a temperature of more than 200 degrees F. when the device is attached to the vehicle component.

6. The device of claim 5, wherein the polymeric material comprises a polyamide.

7. The device of claim 5, wherein the insulative material comprises glass.

8. The device of claim 1, wherein the housing comprises a first portion and a second portion that are ultrasonically welded together.

9. The device of claim 1, further comprising an insulative layer disposed within the interior cavity and disposed between the electronic component and the housing proximate to the plurality of spacers.

10. The device of claim 9, wherein the insulative layer comprises a silicate and a metal.

11. A device for prevention and recovery of a vehicle component, comprising:
a housing having an exterior surface and defining an interior cavity;
an insert with a middle portion of the insert disposed within the interior cavity of the housing and an exterior portion of the insert extending through the exterior surface of the housing;
an electronic component disposed within the interior cavity; and
a plurality of spacers extending from the exterior surface and configured to be adjacent to the vehicle component;
wherein the plurality of spacers defines a channel configured to promote airflow between the device and the vehicle component thereby minimizing heat transfer between the device and the vehicle component.

12. The device of claim 1, wherein the plurality of spacers comprises a thermal conductive material.

13. The device of claim 12, wherein the plurality of spacers are arranged as a heat sink with the heat sink having a length extending along the exterior surface, wherein each spacer has a height extending away from the exterior surface and a width transverse to the height, and wherein each spacer has height to width ratio of at least 3:1.

14. A device configured to be coupled to a vehicle component, comprising:
a housing having an exterior surface and defining an interior cavity, wherein the housing comprises a polymeric material and an insulative material such that the interior cavity does not exceed a temperature of more than 200 degrees F. when the device is attached to the vehicle component;
an electronic component disposed within the interior cavity, wherein the electronic component comprises a battery and a wireless transceiver; and
wherein the electronic component is configured to communicatively couple with a GPS locator;
wherein the battery is configured to energize the wireless transceiver and the GPS locator when power from an external power source is interrupted; and
wherein, when power from an external power source to the electronic component is interrupted, the electronic component is configured to (i) cause the wireless transceiver to generate an alert signal and (ii) cause the GPS locator to generate a location signal.

15. The device of claim 14, wherein the electronic component further comprises at least one of a siren, an audio sensor, an accelerometer, a gyroscope, a cellular modem, or combinations thereof.

16. The device of claim 14, further comprising:
a plurality of spacers extending from the exterior surface and configured to be adjacent to the vehicle component;
wherein the plurality of spacers defines a channel configured to promote airflow between the device and the vehicle component thereby minimizing heat transfer between the device and the vehicle component;
optionally, the plurality of spacers is adapted to be adjacent to a catalytic converter.

17. The device of claim 16, wherein the plurality of spacers comprises a thermal conductive material.

18. The device of claim 14, wherein the housing comprises a first portion and a second portion that are ultrasonically welded together.

19. The device of claim 14, further comprising an insulative layer disposed within the interior cavity and disposed between the electronic component and the housing proximate to a plurality of spacers.

20. The device of claim 19, wherein the insulative layer comprises a silicate and a metal.

* * * * *